United States Patent Office 3,262,762
Patented July 26, 1966

3,262,762
HIGH TEMPERATURE-RESISTANT MATERIALS OF ALUMINUM, BORON, CARBON, NITROGEN AND SILICON, AND THEIR PREPARATION
Max F. Bechtold, Kennett Square, Pa., assignor to E. I. du Pont de Nemours and Company, Wilmington, Del., a corporation of Delaware
No Drawing. Filed Dec. 27, 1963, Ser. No. 334,042
9 Claims. (Cl. 29—182.5)

The preferred compositions and processes of this invention yield accurately shaped objects by a brief process carried out at temperatures as low as 700° C. that are ready for immediate use in air at 1650° C. and higher and at this temperature exceed the properties, particularly strength per unit weight, obtained for the best commercial samples of self-bonded silicon carbide, translucent aluminum oxide, and for hot-pressed aluminum nitride. This is indicated in Table I below.

TABLE I.—HIGH TEMPERATURE PROPERTIES OF VARIOUS MATERIALS

| Composition [1] | TRS [2] at 1,650° C. in Air (p.s.i.) | TRS [2]/ Density (p.s.i./g./cc.) | Resistivity (ohm-cm.) (approx.) |
|---|---|---|---|
| Commercial Objects: | | | |
| SiC (self-bonded) | 24,200 | 7,830 | $1.5 \times 10^{-2}$ |
| $Al_2O_3$ (translucent) | 20,200 | 5,100 | $>10^9$ |
| AlN (97% dense) | 13,900 | 4,407 | $>10^8$ |
| Objects of This Invention: [3] | | | |
| 40 Al-30 B/C-30 SiC+$N_2$ | 35,000 | 14,950 | $>10^6$ |
| 50 Al-20 B/C-30 SiC+$N_2$ | 31,600 | 13,200 | $10^{-1}$ |
| 55 Al-22.5 B/C-22.5 SiC+$N_2$ | 26,800 | 11,200 | $5+10^{-3}$ |
| 60 Al-30 B/C-10 SiC+$N_2$ | 25,600 | 11,400 | $<10^{-3}$ |

[1] B/C refers to boron carbide.
[2] Transverse rupture strength.
[3] Proportions by weight of Al, B/C and SiC.

This application is a continuation-in-part of my co-pending, coassigned application Serial No. 78,830, filed December 28, 1960, now abandoned.

This invention relates to high temperature-resistant materials of aluminum, boron, carbon, nitrogen and silicon, to such materials modified with oxygen, to articles of manufacture prepared from or composed of these materials, and to a method for preparing such articles.

Recently there has been great interest in high temperature materials capable of withstanding high loads at elevated temperatures and also capable of resisting corrosion by hot gases. Demand for such high temperature materials has been especially heavy since commercial development of jet engines and rockets, which have been progressively improved in design to operate at higher and higher temperatures. Many high temperature metals, including super-alloys and the refractory metals, such as molybdenum, have been used as turbine blades, fans, nozzles for jet engines, gas turbines, rockets, and the like, but such materials have not been too satisfactory in view of the increased high temperature requirements imposed. These materials tend to soften at high operating temperatures or require protective coatings against oxidation, and are in general difficult to machine into precise shapes. Other materials proposed for these uses, such as graphite, silicon carbide and metal oxides, suffer from similar deficiencies as well as brittleness.

The present invention provides materials having high strength and durability at elevated temperatures in air which are derived from readily available inexpensive light elements. These materials are strong, low in density, oxidation-resistant at high temperatures (oxidation may occur but the resultant oxide forms a protective coating), machinable to a considerable degree and possess other desirable properties. These properties result from two essential property-defining structures, viz., a solid, continuous, matrix structure containing nitride and carbide, and a metallic structure, both of which are discussed in detail below. The essential elemental constituents of these materials are aluminum, boron, carbon, nitrogen, and silicon in the proportions, by weight of 15–73% Al, 3–45% B, 1.5–20% C, 3–26% N, and 3–40% Si. The materials and objects of this invention may also contain up to 30% oxygen as aluminum oxide, all percentages being in terms of percent by weight of total Al, B, C, N, and Si.

The shaped objects or articles of manufacture of this invention are prepared by machining or otherwise shaping materials of this invention or by initially forming the materials in the desired shape. The materials and shaped objects, sometimes hereinafter referred to as converted compositions, objects or articles, are prepared from substantially homogeneous powder compositions, as hereinafter described.

The solid continuous matrix structure of the materials and articles is refractory at high temperature and is semi-metallic or non-metallic in nature. It contains aluminum nitride and boron carbide and/or silicon carbide as essential strength-producing constituents and may, in non-converted compositions, contain oxygen in several forms, e.g., aluminum oxide, silicon dioxide, and boron oxide. If $SiO_2$ is present, the free aluminum present when the composition is processed or used at high temperatures will reduce $SiO_2$ forming $Al_2O_3$ and an aluminum silicon alloy.

The other essential property-defining structure, which is metallic, constitutes up to 67%, preferably up to 50%, by weight of the converted objects. This structure contains metallic aluminum in non-oxidized and non-nitrided condition, which may be in the form of Al per se or silicon and/or boron alloys thereof, for increased machinability, good electrical and thermal conductivity, good impact resistance and improved oxidation resistance at temperatures of 1400–2000° C.

The metallic structure is fluid at high temperature and is able to flow, diffuse or migrate to the surface of the shaped object to provide upon contact with the atmosphere an oxidation-resistant surface layer which is self-healing, i.e., reforms immediately if ruptured at high temperature in air. The metallic structure may, of course, contain other phases dispersed therein, which may be metallic or non-metallic, separate from the rigid matrix structure. The metallic structure tends to be continuous and highly conducting of electricity, especially when it comprises above about 20% by weight of the final converted composition.

To insure adequate self-healing properties, it is essential that aluminum, in the form of elemental aluminum and/or alloys thereof with silicon and boron, in the metallic structure constitute at least 5%, preferably at least 10% (by weight), of the materials and objects of this invention. The presence of the metallic structure and the phases dispersed therein is easily demonstrated by metallography, including hardness measurements, and by X-ray diffraction techniques. The proportion of aluminum in the converted compositions is readily calculated from composition data by assigning all nitrogen and oxygen present to aluminum nitride, AlN, and oxide, $Al_2O_3$, respectively. Boron nitride, like silicon nitride, is unstable in the presence of aluminum at high temperature and is not present in the converted compositions of this invention. The aluminum thus accounted for in terms of nitride and oxide is subtracted from the total amount present in in the composition, leaving as difference the amount present in the metallic structure.

It will be apparent from the foregoing that the materials and articles of manufacture of this invention do not encompass simple mixtures or complex compounds composed entirely of nitrides, carbides and oxides. In other words, the compositions cannot be prepared from combinations of AlN, $Si_3N_4$, $B_4C$, SiC, $SiO_2$, $B_2O_3$, and $Al_2O_3$.

The materials of this invention have properties that are outstanding for application as electric heating elements. They are superior to Al-N-Si compositions for shielding for nuclear reactors, and for the generation of electricity by application of heat by virtue of their thermoelectric power. When these materials are derived from combinations of aluminum, boron carbide and silicon nitride, they are less dependent on heat-treatment in air for the development of full strength than are Al-N-Si compositions, especially when less than about 50% Al is used, and are less subject to distortion and cracking than are materials not containing boron carbides. An important advantage of such materials is their outstanding weight and dimensional stability in the range of about 1150–1350° C. after preliminary heat-treatment at 500–1100° C. This effect is most pronounced in hot-pressed specimens. Moreover, after one exposure to the complete range (500°–1500° C.) of temperatures used in the standard oxidation tests (see below), the present materials are remarkably stable, both in weight and dimensions during further exposure to temperatures in this range. Converted compositions of aluminum-boron carbide-silicon nitride containing about 50–65% Al are strengthened considerably by heat-treatment and show a rise in electrical resistance to values suitable for electrical heating elements. In some cases the transverse rupture strength (at 1500° C.) of such materials may increase during heat-treatment from a value as low as 700 p.s.i. to values of 11,000 p.s.i. and higher.

Converted materials outside the above-defined ranges are deficient in such properties as transverse rupture strength, resistance to high temperature oxidation and freedom from mechanical defects. The use of less than 15% aluminum is undesirable because of the extreme brittleness of the products. On the other hand, when more than 73% aluminum is present, the high temperature strength is undesirably low and the compositions exhibit cracking and poor shape stability during firing in air. Materials with excellent strength and oxidation resistance are obtained when the aluminum content is in the range of 30–60%, and preferably in the range of 40–60%.

The use of less than 3% nitrogen also leads to poor shape stability and to low high-temperature strength. When more than 26% nitrogen is employed, the compositions are undesirably brittle and sensitive to moisture. Converted compositions containing 3–20% N have very desirable properties and the best combination of properties is obtained when the nitrogen content is in the range of 4–15%.

Proportions of silicon below 3% lead to reduced oxidation resistance, while the use of more than 40% silicon leads to excessive brittleness and to silicon exudation when the final converted composition is employed at temperatures in the range of 1400° C. and above. At least 3% boron and preferably at least 5% boron is necessary to obtain enduring weight stability when heating in the air at temperatures in the range of about 1100–1400° C., after preliminary treatment at 500–1100° C. The presence of more than about 45% boron results in brittle products having reduced electrical conductivity. It is better to use 3–28% boron, preferably 5–28% boron.

The carbon content of the compositions should not exceed 20% since larger amounts tend to detract from high temperature properties. Similarly, it is desirable that the oxygen content not exceed 30% based on a total of aluminum, nitrogen, silicon, boron and carbon. It is better if the oxygen content is less than 10%, and preferably less than 5%.

Oxygen is supplementary to nitrogen and carbon in the sense that oxygen in combination with aluminum provides a refractory phase for the rigid matrix of the converted objects of this invention.

It is apparent from the foregoing that converted compositions containing 3–28% boron form a preferred class of this invention. Still more preferred are those compositions containing 30–60% Al, 3–28% B, 2–20% C, 3–20% N, and 3–40% Si. Most preferred are those containing 40–60% Al, 5–28% B, 2–20% C, 4–15% N, and 3–40% Si.

For extreme strength at high temperatures, materials of this invention made by nitriding compacts of aluminum-boron carbide-silicon carbide powders are outstanding and are superior in high temperature oxidation resistance to non-nitrided products obtained by heating such compacts in air. Generally such compositions are prepared from aluminum-boron carbide-silicon carbide mixtures containing 15–73% Al, with boron carbide and silicon carbide in the ratio of 1:3–3:1. The best compositions are produced by nitridation of compacts containing 40–60% Al, with boron carbide and silicon carbide in the ratio of 5:3–3:5. Compacts of aluminum-boron carbide-silicon carbide converted without prior contact with nitrogen at above 670° C., e.g., by hot-pressing in air, or by cold-pressing followed by air-firing are prone to disintegrate to powder upon standing at atmospheric conditions in air. This disintegration apparently is due to hydration or hydrolysis of a constituent not present in the adequately nitrided compacts. In preparing these nitrided materials, it is preferred that nitriding be carried out at 700–1425° C., preferably 750–950° C., for about one hour since products so nitrided commonly exhibit transverse rupture strengths at 1650° C. in air of 25,000–35,000 lb./sq. in. without plastic yield. Objects nitrided at somewhat higher temperatures in the range of 1000–1425° C. are also useful, but tend to have slightly lower transverse rupture strengths.

In the aluminum-boron carbide-silicon carbide composition (as well as in the other compositions of this invention), nitridation tends to attack the metal-metal contacts made by pressing, i.e., disrupts some of the aluminum containing continum, while increasing pressure in compaction tends to preserve such contacts. Thus, by control of pressure, composition and degree of nitridation, final objects of any given electrical resistivity in the range from about $10^{-4}$ to greater than $10^{+6}$ ohm-cm. can be prepared. Electrical resistance tends to decrease with increasing concentrations of aluminum and silicon carbide in the final object. Increasing aluminum concentration also tends to decrease high temperature strength, but to increase oxidation resistance, machinability, and impact strength.

The converted compositions and objects of this invention are prepared from substantially homogeneous powder compositions containing aluminum, boron, carbon, nitogen, and silicon, in the proportions, by weight, 15–73% Al, 3–45% B, 1.5–20% C, 3–26% N, and 3–40% Si. Such compositions may also contain up to 30% oxygen (based on the total of aluminum, boron, carbon, nitrogen, and silicon) in the form of aluminum oxide. However, it is preferred that oxygen be introduced by heating the converted material in an oxidizing atmosphere such as air or oxygen. Powder compositions containing smaller proportions of nitrogen than that indicated above or even entirely devoid of nitrogen can also be employed and the desired nitrogen introduced by nitriding. Whatever the method of preparation, the aluminum present must exceed the amount required to react with the nitrogen and oxygen desired in the final product by at least 5%, preferably at least 10% by weight. The preferred proportions of the essential elements in the powder are the same as those mentioned above in connection with the converted materials of this invention with the proviso that the proportion of nitrogen may be reduced or nitrogen may be entirely absent and the desired proportion introduced by nitriding.

In preparing the materials of this invention, aluminum is preferably introduced as the free metal in either powder or flake form. Susceptibility to nitridation and volume change can be controlled in part, as illustrated in the examples, by the proportions of flake and powder used. Alloys of aluminum with silicon and/or boron can also be employed. Boron is preferably used in the form of boron carbide, although elemental boron or aluminum-boron alloys can be used, while the preferred source of carbon is boron carbide or silicon carbide. Elemental carbon or aluminum carbide should be avoided. As indicated above, nitrogen is preferably introduced by nitriding and for this purpose elemental nitrogen or in some cases ammonia, especially at nitridation temperatures above 850° C., may be used. If nitrogen is to be included in the powder composition, it is preferably in the form of silicon nitride. Silicon is preferably employed as silicon carbide, but elemental silicon, silicon nitride and aluminum-silicon alloys may sometimes be used.

It is preferred that at least 75% (by weight) of the powder composition has a particle size of less than 75 microns since uniform converted compositions are readily obtained from such powders. However, materials of larger particle size, i.e., of 150 microns or more, give useful products. To insure uniformity of the powder metallurgy composition, the particulate raw materials used to make up the composition are intimately mixed either during grinding or, if properly sized, powdered components are initially employed, after or during their placement in a common container.

The powder compositions are readily shaped, for example, by cold-pressing at a pressure of 5000–60,000 lb./sq. in. or more, by slip-casting, or by extrusion at a temperature below 700° C. and then converted by firing (e.g., by placing the shaped object directly in a hot atmosphere) at a temperature of at least 700° C., but preferably not above 1700° C. Most preferably the temperature is in the range of 750–1500° C. Firing can be carried out in air, in an inert atmosphere, in vacuum, in which case a temperature of 900°–1200° C. is preferred, or in nitrogen if a nitrogen deficient composition is being utilized. Sintering in nitrogen at about 850° C. produces exceptionally strong objects. This may be carried out by placing the object in a nitrogen atmosphere at room temperature, then heating to sintering temperature. Since a calorescent reaction occurs when the powder metallurgy compositions are heated to firing temperature, the actual temperature attained by the composition during conversion is usually much higher than the nominal firing temperature. Sintering at low temperatures, i.e., 700–900° C. can be done slowly enough to avoid calorescent reactions. Converted objects are also obtained by hot-pressing the powder compositions at a pressure of at 1000 lb./sq. in. and a temperature of at least 700° C., but preferably not above 1700° C. Most preferably the temperature is in the range of 1100–1500° C. and the pressure is between 2000 and 5000 lb./sq. in.

The time of heating the powder compositions at the above temperatures must be at least sufficient to insure sintering of the particles of the powder composition, if the novel converted objects having the unexpected characteristics herein disclosed are to be formed. Times of 30 seconds to 30 minutes usually suffice, although longer periods may be employed if desired without detrimental effect. In fact, longer times (e.g., 16 hours or more) are sometimes advantageous to develop the maximum strength and to increase the electrical resistance. It is preferred that heating, if carried out in air, be rapid to avoid undue oxidation of the powder composition before conversion.

The powder compositions may be converted by compressing and firing in the dry state. However, it is convenient to use slip-casting or pottery-molding techniques whereby the powder is moistened wtih a liquid, e.g., water, to assist in forming it into the desired shape. Acidic aqueous solutions prepared by adding sufficient acetic acid to a dilute aqueous solution of NaOH (containing up to 2% NaOH) to provide a pH less than 7 are particularly desirable for this purpose and produce shaped objects which, after drying and firing, form converted objects having desirable properties. It is essential that any water or other volatile liquid present in the shaped powder object be reduced to less than about 3% (by weight) before heat-treatment to prevent rupture of the object during firing or sintering.

The powder compositions of this invention, especially those rich in aluminum, can also be formed by compacting and extruding, before firing or sintering.

When nitrogen is introduced during conversion of the powder composition to alloy by carrying out the conversion in an atmosphere of nitrogen or ammonia, the composition is heated in the nitrogenous atmosphere at a temperature of at least 700° C., preferably not above 1700° C., until the desired nitrogen content has been obtained. Most preferably the temperature is in the range of 750–1500° C. A period of 0.5–10 hours at a temperature above 700° C. is usually sufficient for nitridation. Although nitridation is usually carried out at approximately atmospheric pressure, i.e., at a pressure in the range of 0.5–2 atmospheres, somewhat higher pressures (not to exceed about 10 atmospheres) are sometimes advantageous in promoting more rapid reaction with nitrogen.

In nitriding, care must be exercised to insure that sufficient nitrogen is introduced so that the nitrided product contains at least 3% nitrogen, but that nitridation is not so complete as to reduce, below the limits hereinbefore stated, the free aluminum necessary for maintenance of self-healing properties on high temperature exposure in air. For example, in nitriding a composition containing 40 Al-30 $B_4C$-30 SiC, which theoretically can absorb up to 20.76% nitrogen, the nitrogen uptake should be limited to about 15% to avoid loss of oxidation resistance. In preparing compacts for nitridation, a compaction pressure should be employed that is sufficiently low to produce a compact readily penetrated by nitrogen during the nitriding step. For the composition discussed above, pressure of 40,000–100,000 lb./sq.in. can be used without detrimental reduction in the accessibility to nitrogen. However, compositions containing larger proportions of aluminum, i.e., in the range of 60–70% aluminum require lower compacting pressures on the order of 20,000–40,000 lb./sq. in. unless nitrogen under pressure and/or long nitriding times are used.

A preferred method of fabricating articles of manufacture of this invention comprises forming the powder composition into a desired shape, e.g., by cold-pressing, partially sintering the thus shaped composition, i.e., heating the composition to a temperature below that at which calorescence occurs, machining or extruding the partially sintered body to the precise shape desired, and then finish-firing to complete conversion of the composition. The prefiring or partial firing step serves to bind the particles of the powder composition together giving a strong but easily machinable object. The finish-firing step converts the machined, partially fired composition to an object of this invention, and relieves such composition from the internal stresses normally effected by machining. Since the objects of this invention are more difficult to machine after complete firing, i.e., after calorescence, this method provides a practical route to articles of manufacture, even where dimensional tolerances are low.

The invention is illustrated in greater detail by the following examples. In these examples, the starting materials employed were of ordinary commercial purity. Transverse rupture strength was measured with an "Instron" low-speed tensile tester Type TT–C–L using a specimen nominally 1/4" x 1/4" in cross-section supported symmetrically by parallel ceramic rods 1/8" in diameter and 1" apart mounted on a supporting test fixture. Force was applied at the center of the portion of the bar between the supports by the edge (2" long, radius 1/16") of a V-shaped fixture.

As standard tests of oxidation resistance, the changes in weight and linear dimensions of test specimens were determined after exposure in air to temperatures of 500°, 750°, 1000°, 1100°, 1200°, 1300°, 1400°, and 1500° C. (Test A), or 500°, 750°, 1000°, 1250°, and 1500° C. (Test B), for 16 hours at each temperature. After each heating period, the specimen was cooled to room temperature, weighed and measured. Results are expressed as the cumulative percentage change occurring during the heat-treatments based on the original values.

Example I

This example illustrates the preparation of aluminum-boron-carbon-nitrogen-silicon powder compositions and converted objects in which boron and carbon are introduced as boron carbide. A powder composition containing 45.4% Al, 7.1% B, 2.0% C, 18.2% N, and 27.2% Si was prepared from silicon nitride and boron carbide powders by ball-milling for 24 hours at 85 r.p.m. in a porcelain ball-mill (250 cc. capacity) containing a dozen 3/4" x 3/4" porcelain cylinders. Aluminum was introduced as standard, unpolished, non-leafing flake aluminum (90% less than 325 mesh, U.S. Standard Sieve Series). The milled mixture was screened to remove particles larger than 75 microns and converted by cold-pressing at 30,000 p.s.i., and air-firing at 1150° C. for 2 minutes. The product had a density of 2.11 g./cc., a transverse rupture strength at 1300° C. of 3620 p.s.i., a resistivity of 0.004 ohm-cm. and exhibited a dimensional change on heating in standard oxidation Test A of 0.32%. During firing a slight shrinkage occurred in this composition. Such shrinkage can, however, be reduced to zero or even changed to slight expansion by substitution of an atomized Al powder (about 94% less than 325 mesh) for part or all of the flake Al.

The strength, hardness and electrical resistance of the converted products of this kind were increased markedly by the heat-treatment during oxidation testing.

Example II

A powder containing 54.2% Al, 19.6% B, 5.1% C, and 21.1% Si was prepared by ball-milling a mixture of aluminum, boron carbide and silicon. The powder was screened through 200 mesh to remove oversize particles and was pressed at room temperature under a pressure of 30,000 p.s.i. into the form of bars 2" in length and 1/4" x 1/4" (nominal) in other dimensions. These bars were heated in a stream of purified nitrogen as follows:

| Time (min.): | Temp. (° C.) |
|---|---|
| 15 | 350 |
| 80 | 650 |
| 117 | 900 |
| 167 | 1020 |
| 242 | 1175 |
| 292 | 1280 |
| 330 | 1400 |
| 360 | 1400 |
| 480 | 600 |

When the furnace reached 600° C. on the cooling cycle, the samples were removed, cooled and weighed. They were then surface-ground slightly to remove surface debris.

The converted bars contained 43.9% Al, 15.9% B, 4.1% C, 19.1% N, and 17.1% Si. They exhibited a transverse rupture strength at 1400° C. of 19,580 p.s.i. During nitridation, density of the bars increased from 1.85 g./cc. to 2.28 g./cc. and resistivity from less than 0.002 ohm-cm. to 22 ohm-cm., while weight increased 23.58%, thickness 2.12% and width and length decreased by 1.43% and 1.74%, respectively.

Example III

A mixture containing 30 g. of aluminum flake, 39 g. of boron carbide powder (containing by analysis 72% B, 22% C, 2.5% $B_2O_3$, 2.5% Fe, 0.7% Al, remainder 0.3%) and 31 g. of silicon carbide was dry-milled for 16 hours at 85 r.p.m. in a 250 cc. porcelain ball-mill containing twelve porcelain cylinders (3/4" x 3/4"). The fine powder so produced was formed into bars by pressing at room temperature under 30,000 lb./sq. in. and the bars were conditioned at 60° C. in air for at least one hour. A bar was nitrided by heating slowly to 1150° C. in a nitrogen atmosphere and maintaining this temperature for 0.5 hour before cooling again to room temperature. The atmosphere of nitrogen was maintained during the entire heating and cooling period. As a result of nitriding, the bar increased 8.73% in weight, 3.29% in thickness, 1.50% in width, and 0.20% in length. The density increased from 2.07 g./cc. to 2.14 g./cc. The nitrided product contained 28.1% Al, 26.6% B, 16.8% C, 8.2% N, and 20.3% Si, based on the total of these elements present, was straight, grey-surfaced, fileable and metallic in appearance. The electrical resistance from end-to-end (after grinding off the surface layer) was 0.3 ohms. On heating successively for 16 hours at each of 500°, 750°, 1000°, 1250°, and 1500° C. (Test B), changes were measured at room temperature after each stage of heating, as shown in Table II. The resultant bar had a density of 2.16 g./cc. and a transverse rupture strength in air at 1550° C. of 18,600 lb./sq. in. with no yield point.

TABLE II.—CHANGES ON HEATING IN AIR

| Temperature, ° C. | Weight Percent Change | Dimension Percent Change [1] | Resistance (ohm) | Appearance |
|---|---|---|---|---|
| 500 | 0.24 | 0.03 | 0.25 | Dark and metallic. |
| 750 | 0.51 | 0.18 | 1.5 | Very slightly oxidized. |
| 1,000 | 0.46 | 0.39 | | Grey and mottled. |
| 1,250 | 0.74 | 0.57 | $10^3$ | Do. |
| 1,500 | 2.35 | 1.33 | $10^6$ | Uniform grey, speckled with white. |

[1] Average of three dimensions.

Example IV

A mixture containing 40 g of aluminum flake, 5 g. of boron powder, 5 g. of silicon powder, and 50 g. of silicon carbide powder was milled for 16 hours as described in Example III. The finely powdered mixture was pressed at 30,000 lb./sq. in. at room temperature and then sintered in nitrogen at 1300° C. for 0.5 hour. The nitrogen atmosphere was maintained while the bar cooled to room temperature. During sintering in nitrogen, the bar gained 17.67% in weight and 2.31% in width. The length of the bar decreased by 0.78% and the thickness by 0.15%. Density increased from 2.02 g./cc. to 2.34 g./cc. The sintered bar had an electrical resistance from end-to-end of 40 ohms and contained 34.0% Al, 4.3% B, 12.7% C, 15.0% N, and 34.0% Si.

Example V

A mixture of 80 g. of aluminum flake, 60 g. of boron carbide powder, and 60 g. of silicon carbide powder was ball-milled for 16 hours under the conditions described in Example III. The fine powder so obtained was pressed into a bar at 30,000 lb./sq. in. at room temperature and the bar sintered in nitrogen as described in Example IV. During sintering, the bar gained 8.44% in weight and 1.08% in width, and lost 0.26% in length and 0.16% in thickness. The density increased from 1.97 g./cc. to 2.13 g./cc. on sintering. The sintered bar was grey, fileable and metallic, had an electrical resistance measured from end-to-end of 0.8 ohm and contained 37.6% Al, 20.2% B, 14.6% C, 7.9% N, and 19.7% Si. The bar was submitted to heat-treatment in air at successively increasing temperatures as described in Example III with a total gain in weight of 0.75% and a total gain in average dimension of 0.27%. The bar had a transverse rupture strength at 1500° C. of 17,400 lb./sq. in. On fracture, the bar was found to be composed of a hard case surrounding a more porous core.

Example VI

A mixture of 50 g. of aluminum flake, 10 g. of boron carbide powder, and 40 g. of silicon carbide powder was ball-milled for 16 hours under the conditions described in Example III. The powder was pressed into a bar at 30,000 lb./sq. in. and room temperature and then sintered in nitrogen for one hour at 800° C. On sintering, the bar gained 13.79% in weight and 0.40% in thickness, and lost 0.56% in width and 0.88% in length. Density increased from 1.90 g./cc. to 2.19 g./cc. The sintered bar contained 44.0% Al, 6.8% B, 12.4% C, 12.1% N, and 24.7% Si. On heating in air successively for 16 hours at each of 500°, 750°, 1000°, 1250°, and 1500° C., the bar gained 5.48% in weight and 0.30% in average dimension. The heat-treated bar, after removal of surface oxide on the ends, had an end-to-end electrical resistance of 1000 ohms. The transverse rupture strength of this bar at 1650° C. was 28,500 lb./sq. in.

Example VII

A mixture containing 54.5% Al, 7.1% B, 2.0% C, 14.5% N, and 21.9% Si in the form of aluminum powder (109.1 g. equal parts dust and flake), silicon nitride powder (72.7 g.), and boron carbide powder (18.2 g.) was ball-milled in a 1-quart porcelain mill containing 50 ¾" diameter x ¾" long porcelain cylinders for 24 hours at 80 r.p.m. A portion of this powder after removal from the mill was compacted by pressing at 30,000–40,000 lb./sq. in. in a 1" diameter cylindrical mold at room temperature. The cylinder so produced was machined to 0.95" diameter and one end was tapered to a conical frustum. This cylinder had a density of 2.14 g./cc. and was bright and metallic in appearance.

The machined cylinder was extruded after preheating at 677° C. through a die using a ram pressure ranging from 80 tons/sq. in. at the beginning of the extrusion to 40 tons/sq. in. at the end of the extrusion. The extruded rod was heated for 3 hours at 60° C. and was then fired by placing in a hot-air furnace for 5 minutes at 1150° C. The rod attained 1150° C. in 60 seconds and a maximum temperature above 1150° C. in 75 seconds. The density of the fired rod was 2.69 g./cc. The product was a strong metallic rod which was fileable and had low electrical resistance. The extruded rod before firing exhibited surprising strength in transverse bend having a yield point at 22,000 lb./sq. in. and a rupture strength of 60,000 lb./sq. in. After heating in air at 500°–1500° C. in the standard oxidation Test A, the converted rod was unusually durable in air at temperatures above 1500° C. when heated by its own electrical resistance, and was apparently more homogeneous (no hot spots) than non-extruded rods of similar composition.

Example VIII

A mixture of 64.1 g. of aluminum flake, 9.1 g. of boron carbide powder and 31.8 g. of silicon nitride powder was ball-milled as described in Example III, compressed into a bar at 30,000 lb./sq. in. and room temperature, and sintered in nitrogen at 1300° C. as described in Example IV. On sintering, the bar gained 8.57% in weight and decreased in dimensions by 2.01% in width, 1.19% in thickness and 2.00% in length. The density increased on sintering from 2.03 g./cc. to 2.33 g./cc. The strong, metallic bar obtained had a resistance less than 0.02 ohm measured from end-to-end and contained 56.4% Al, 18.8% N, 16.8% Si, 6.3% B, and 1.7% C. On heat-treatment in air at successively higher temperatures up to 1500° C., as described in Example III, the bar gained 1.22% in weight and 0.19% in average dimension. The resistance measured from end-to-end after heat-treatment was 0.1 ohm. The bar was cut transversely showing it to consist of a hard, bright, metallic case (approximately 1/16" in thickness) around a softer black core. The hardness of the case was 760 (Knoop hardness number), measured at 1000 g. load and 1575 at 100 g. load. The core by contrast had a Knoop hardness number of 90 at 1000 g. load. Transverse rupture strength, measured at 1500° C. in air on two portions of the cut bar having the hard case on three sides was 8550 and 6710 lb./sq. in. A measurement of transverse rupture strength on the case material removed from the porous core material gave a value of 9980 lb./sq. in. at 1550° C. The case material had a density of 2.63 g./cc.

Example IX

Three compositions of aluminum flake with commercial boron carbide and silicon carbide powders were dry ball-milled at 80 r.p.m. for 16 hours in a 1-quart porcelain ball-mill containing 25 ¾" x ¾" porcelain cylinders. Table III shows the proportions by weight of the ingredients and of the essential elements contained therein. These compositions were next compacted at room temperature into bars nominally ⅝" x ⅝" x 4½" long, using steel molds, at pressures indicated in Table III.

TABLE III.—COMPACTION OF POWDER COMPOSITIONS

| Input Composition | (a) Al (g.) | (b) B/C (g.) | (c) SiC (g.) | Pressure (p.s.i.) |
|---|---|---|---|---|
| A | 100 (50 Al, | 40 15 B, 14 C, | 60 21 Si)* | 50,000 |
| B | 110 (55 Al, | 45 16.9 B, 12.3 C, | 45 15.8 Si)* | 45,000 |
| C | 120 (60 Al, | 60 22.5 B, 10.5 C, | 20 7 Si)* | 40,000 |

(a) Standard commercial unpolished powder (flake form) >99% Al.
(b) Commercial abrasive boron carbide, ca. 75% B, 25% C.
(c) Commercial silicon carbide, ca. 70% Si, 30% C.
*Proportions of Al, B, C, and Si.

Bars from each composition were nitrided by placing in a tube furnace (at room temperature) with flowing $N_2$, then heating to 850° C. and holding for times indicated in Table IV, followed by cooling to room temperature. Changes during nitridation, as well as electrical resistance and composition of the bars after nitridation are also shown in Table IV. It is to be noted that bars 2 and 3 are not part of this invention and are included for comparative purposes only.

TABLE IV.—PROPERTIES OF NITRIDED COMPOSITIONS

| Bar | Input Composition | Nitridation Time (hrs.) | Δ N₂ᵃ (percent) | Δ Dᵇ (percent) | Rᶜ (ohms) | Composition after Nitridation | | | | |
|---|---|---|---|---|---|---|---|---|---|---|
| | | | | | | Al | B | C | N | Si |
| 1 | A | 1 | 3.23 | 0.54 | 0.02 | 48.4 | 14.5 | 13.6 | 3.1 | 20.3 |
| 2* | B | 1 | 2.29 | 0.29 | 0.02 | 53.8 | 16.5 | 12.0 | 2.2 | 15.4 |
| 3* | C | 1 | 2.00 | −0.11 | 0.02 | 58.8 | 22.0 | 10.3 | 2.0 | 6.9 |
| 4 | A | 2 | 6.34 | 0.58 | 0.05 | 47.0 | 14.1 | 13.2 | 6.0 | 19.7 |
| 5 | B | 2 | 6.33 | 0.30 | 0.05 | 51.7 | 15.9 | 11.6 | 6.0 | 14.9 |
| 6 | C | 2 | 5.13 | −0.10 | 0.02 | 57.1 | 21.4 | 10.0 | 4.9 | 6.7 |
| 7 | A | 4 | 7.53 | 0.78 | 0.80 | 46.5 | 13.9 | 13.0 | 7.0 | 19.5 |
| 8 | B | 4 | 8.49 | 0.46 | 0.29 | 50.7 | 15.6 | 11.3 | 7.8 | 14.6 |
| 9 | C | 4 | 8.45 | 0.06 | 0.30 | 55.3 | 20.7 | 9.7 | 7.8 | 6.5 |

ᵃ Weight of N₂ gained (percent) during nitridation.
ᵇ Average increase in three dimensions of rectangular bar (percent).
ᶜ Resistance end-to-end of the bars (approximately 4½″ x ⅝″ x ⅝″) after nitridation.
* Included for comparison only; not a part of this invention.

After nitridation these bars, which were all straight, grey, and metallic, were broken by room temperature testing in transverse bending with results as indicated in Table V into two pieces, one 1.5″ long and one 3″ long. The butt ends of the 1.5″ pieces were heated with a natural gas-oxygen torch flame to test resistance to thermal shock. The 3″ pieces were subjected to prolonged oxidation by heat-treatment in air with changes as indicated in Table VI, then tested at room temperature in transverse bend and one of the pieces therefrom tested for thermal shock resistance. Results of these tests are shown in Table V.

It is significant that all compositions after nitridation at 850° C. gave very strong, useful bars with only very slight tendency to exude Al (or Al alloys) as beads in the thermal shock test. Furthermore, all survived prolonged heating in air at 500°–1500° C. with a dimensional increase of not more than 0.56% except for bar 9. The inferior dimensional stability of bar 9 is attributed to low permeability resulting from overnitridation of the surface, which interfered with diffusion thereto of Al (or Al alloys) required for protection during oxidation. All bars survived heat-treatment with high strength (>11,000 p.s.i.) and also a thermal shock test afterward. It is important to note that the heat-treated portions of bars 2 and 3, which contained only 2.2% and 2% N₂, respectively, and are therefore not a part of this invention, disintegrated to powder during storage at room conditions for four months, while all non-heat-treated pieces and the other heat-treated bars remained intact and strong during such exposure.

TABLE V.—PROPERTIES OF NITRIDED COMPOSITIONS

| Bar | Before Heat-Treatment | | After Heat-Treatment | |
|---|---|---|---|---|
| | TRSᵃ (p.s.i.) | Thermal Shockᵇ Test (Beads) | TRSᶜ (p.s.i.) Room Temp. | Thermal Shockᵈ Test (Beads) |
| 1 | 18,380 | Fine | 11,600 | Few. |
| 2* | 19,820 | Few, fine | 12,200 | Do. |
| 3* | 21,600 | Some | 19,700 | Some. |
| 4 | 27,200 | None | 15,500 | Few. |
| 5 | 26,800 | do | 21,900 | Few. |
| 6 | 25,600 | Few, fine | 23,500 | Very few. |
| 7 | 21,000 | do | 17,100 | Do. |
| 8 | 25,400 | do | 18,400 | One. |
| 9 | 23,800 | Two | 19,000 | None. |

ᵃ Transverse rupture strength. Bars broken at room temperature in transverse bend on 2″ span, two point loading, one point ½″ from the end. The fractured ends showed some evidence of a "case" on bars 4 to 9, inclusive.
ᵇ Butt ends (nonfractured ends) of 1.5″ pieces from TRS test subjected to full heat of oxygen/gas hand torch. The flamed ends were only very slightly lighter grey than nonflamed ends. None of the bars cracked during the torch test. Presence or absence of exuded beads of metal is indicated.
ᶜ Same as note (ᵃ) on heat-treated 3″ bars.
ᵈ Same as note (ᵇ) on heat-treated 1.5″ pieces from TRS test. All bars except bar 9 remained free of cracks during this test; bar 9 exhibited only a single crack. Presence or absence of exuded beads of metal is indicated.
*Not a part of this invention; included for comparison only.

TABLE VI.—CHANGES DURING HEAT-TREATMENT IN AIR

| Bar | Heat-Treatment in air¹ at 500°–1500° C. | | | Appearance After Heat-Treatment in Air at 500°–1500° C. |
|---|---|---|---|---|
| | ΔW (percent) | ΔD (percent) | R (ohms) | |
| 1 | 1.95 | 0.28 | 0.4 | Gray, no beads. |
| 2² | 2.21 | 0.51 | 0.1 | Light gray, no beads. |
| 3² | 2.88 | 1.91 | 0.02 | Very light gray, some rough white areas, no beads. |
| 4 | 1.37 | 0.38 | 0.1 | Light gray, few beads at fractured edge. |
| 5 | 2.00 | 0.28 | 0.2 | Light gray, white edges, no beads. |
| 6 | 3.13 | 0.56 | 0.3 | Light gray, white edges, no beads. |
| 7 | 1.25 | 0.43 | 0.05 | Light gray, white edges, few beads at fractured end. |
| 8 | 1.42 | 0.30 | 0.8 | Light gray, no beads. |
| 9 | 6.99 | 3.97 | 15.0 | Thick, rough, white oxide layer, no beads. |

¹ The 3″ pieces from transverse bend test before heat-treatment (Table V) were heated for 16 hours each at 500°, 750°, 1,000°, 1,250° and 1,500° C. in air with cooling to room temperature, weighing and measuring after each heat-treatment. Results shown are cumulative after final 1,500° C. heat-treatment. ΔW=weight gain, ΔD=increase in dimensions (average of three), and R=resistance (end-to-end) of 3″ x ⅝″ x ⅝″ piece after thin surface layer (10⁶ ohms) was ground off the ends at end of heat-treatment.
² Not a part of this invention; included for comparison only.

*Example X*

This example illustrates the preparation of compositions of this invention by nitridation of compacts containing aluminum and equal parts of boron carbide and silicon carbide. The mixtures (see Table VII) were dry ball-milled and pressed at room temperature at 60,000 p.s.i. in steel molds to give bars nominally 2″ x ¼″ x ¼″ in size. These bars were sintered for 1 hour in dry nitrogen at 800° C. for nitridation.

TABLE VII.—COMPOSITION OF ALUMINUM-BORON CARBIDE-SILICON CARBIDE MIXTURES

| Input Composition | Composition (Weight, percent) | | |
|---|---|---|---|
| | Alᵃ | B/Cᵇ | SiCᶜ |
| A | 40 (40.0 Al, 23.0 B, 16.0 C, 21.0 Si) | 30 | 30 |
| B | 50 (50.0 Al, 19.1 B, 13.4 C, 17.5 Si) | 25 | 25 |
| C | 70 (70.0 Al, 11.5 B, 8.0 C, 10.5 Si) | 15 | 15 |

ᵃ Commercial Al flake, except for composition C in which equal parts of flake and dust were used.
ᵇ Commercial high-boron boron carbide (B : C 76.5 : 23.5) to pass 325 mesh (U.S. Standard Sieve Series).
ᶜ Commercial abrasive silicon carbide (Si : C 70 : 30).

One bar from each composition was tested in transverse bend at 1650° C. in air, and a second bar was subjected to heat-treatment in air at 500°–1500° C. Compositions of the nitrided products are shown in Table VIII.

The changes occurring on nitridation, the properties after nitridation, and changes during heat-treatment are recorded in Table IX.

bars were nitrided by heating in flowing nitrogen for 1 hour at 850° C. Compaction conditions and properties of these bars are shown in Tables X and XI.

TABLE X.—NITRIDATION OF COMPACTS

| Bar | Compaction Pressure (p.s.i.) | "Green" Density (g./cc.) | Δ N₂ [1] (percent) | Δ D [1] (percent) | R [1] (ohms) | Density (g./cc.) |
|---|---|---|---|---|---|---|
| 1 | 40,000 | 1.966 | 17.06 | −0.22 | 140 | 2.315 |
| 2 | 40,000 | 1.973 | 17.10 | −0.29 | 140 | 2.330 |
| 3 | 50,000 | 2.040 | 16.89 | 0.07 | 40 | 2.379 |
| 4 | 50,000 | 2.041 | 16.84 | 0.04 | 40 | 2.383 |
| 5 | 60,000 | 2.094 | 14.35 | 0.03 | 4 | 2.393 |
| 6 | 60,000 | 2.094 | 14.61 | −0.02 | 13 | 2.402 |
| 7 | 70,000 | 2.132 | 12.57 | 0.07 | 1.4 | 2.395 |
| 8 | 70,000 | 2.139 | 11.75 | 0.07 | 0.8 | 2.385 |

[1] See Table IV, footnotes (a), (b) and (c).

TABLE VIII.—COMPOSITION OF NITRIDED Al-B/C-SiC COMPACTS

| Composition | Composition After Nitridation | | | | |
|---|---|---|---|---|---|
| | Al (percent) | B (percent) | C (percent) | N (percent) | Si (percent) |
| A-1 | 36.6 | 21.0 | 14.6 | 8.5 | 19.2 |
| A-2 | 37.3 | 21.5 | 14.9 | 6.7 | 19.6 |
| B-1 | 48.5 | 18.5 | 13.0 | 3.1 | 17.0 |
| B-2 | 48.5 | 18.5 | 13.0 | 3.0 | 17.0 |
| C | 67.9 | 11.1 | 7.8 | 3.0 | 10.2 |

TABLE XI.—PROPERTIES OF NITRIDED PRODUCTS

| Bar | Percent Composition After Nitridation | | | | | | | TRS [1] 1,650° C. |
|---|---|---|---|---|---|---|---|---|
| | Al | B | C | N | O | Si | Impurities | |
| 1 | 42.7 | 12.8 | 11.3 | 14.6 | 1.3 | 15.6 | 1.7 | 19,900 |
| 2 | 42.7 | 12.8 | 11.3 | 14.6 | 1.3 | 15.6 | 1.7 | |
| 3 | 42.8 | 12.8 | 11.3 | 14.4 | 1.3 | 15.6 | 1.7 | 29,000 |
| 4 | 42.8 | 12.8 | 11.3 | 14.4 | 1.3 | 15.6 | 1.7 | |
| 5 | 43.7 | 13.1 | 11.5 | 12.5 | 1.4 | 16.0 | 1.7 | 31,600 |
| 6 | 43.6 | 13.1 | 11.5 | 12.7 | 1.4 | 15.9 | 1.7 | |
| 7 | 44.4 | 13.3 | 11.7 | 11.2 | 1.4 | 16.2 | 1.8 | 29,800 |
| 8 | 44.7 | 13.4 | 11.8 | 11.8 | 1.4 | 16.3 | 1.8 | |

[1] See Table V, footnote (a).

TABLE IX.—PROPERTIES AND CHANGES ON HEAT-TREATMENT OF NITRIDED Al-B/C-SiC COMPACTS

| Composition | Changes on Nitridation (%) [1] | | Properties of Nitrided Bars [2] | | Changes of Heat-Treatment [2] | | |
|---|---|---|---|---|---|---|---|
| | Δ N₂ | Δ D | TRS 1,650° (p.s.i.) | R (ohm) | Δ W (percent) | Δ D (percent) | R (ohms) |
| A-1 | 9.24 | 0.66 | 24,700 | 2.4 | | | |
| A-2 | 7.13 | 0.51 | | 0.4 | 10.24 | 1.46 | 50,000 |
| B-1 | 3.19 | 0.16 | 8,970 | 0.05 | | | |
| B-2 | 3.10 | 0.15 | | 0.05 | 6.10 | 1.60 | 0.02 |
| C | 3.14 | −0.55 | | <0.02 | 6.10 | 0.92 | 0.02 |

[1] Weight of nitrogen absorbed (Δ N₂) and average dimensional change (Δ D).
[2] TRS=Transverse rupture strength, R=electrical resistance after heat-treatment; Δ W and Δ D indicate, respectively, weight change and average dimensional change during heat-treatment.

Bars were prepared in an analogous manner containing 18.5% and 26.9% aluminum, respectively, after nitridation. These bars had electrical resistance in the range of 400–3000 ohms and transverse rupture strength at 1650° C. of 5530 p.s.i. and 13,800 p.s.i., respectively.

For comparison purposes, nitrided bars were also prepared having compositions not encompassed by the present invention. These were deficient in one or more properties. Bars containing 10% aluminum were extremely poor in oxidation resistance, and had a transverse rupture strength of only 923 p.s.i. at 1000° C., while bars containing no aluminum were too fragile to handle after nitridation. On the other hand, bars containing 100% aluminum did not nitride to a significant extent and lacked strength at temperatures above 750° C.

*Example XI*

This example illustrates the preparation of compositions of this invention using a mixture of carbides that keep the compact open to nitrogen to a high degree over a considerable compaction pressure range. The example also shows the effect of pressure on green density, extent of nitridation, electrical resistance, and final density, and illustrates the reproducibility of dimensions. The compositions were prepared from a mixture containing 50 parts of aluminum flake, 20 parts of boron carbide (B:C ratio of 75:25) and 30 parts of fine (<1μ) silicon carbide (analysis: 60.8 Si, 27.3 C, 5.2 O, other, 6.7). The mixture was ball-milled and portions pressed at several pressures into bars nominally 2″ x ¼″ x ¼″. These

*Example XII*

Commercial unpolished aluminum flake (50 g.), technical grade boron carbide powder having a B:C ratio of 75:25 (34 g.), and silicon carbide powder having a Si:C ratio of 70:30 (31 g.) were ball-milled for 24 hours at 85 r.p.m. in a 250 cc. porcelain ball-mill containing one dozen ¾″ x ¾″ porcelain cylinders. The resultant fine powder was pressed at 30,000 p.s.i. at room temperature in a steel mold to yield a bar which was sintered in nitrogen for 0.5 hour at 1150° C. On sintering, the bar gained 8.3% in weight, 0.36% in width, and 4.94% in density, and lost 0.38% in thickness and 1.17% in length. The density of the sintered bar was 2.296 g./cc. The sintered bar contained 40.6% Al, 20.7% B, 14.4% C, 6.7% N, and 17.6% Si, and was slightly porous, fileable and aluminum-like in appearance. After being subjected to the standard oxidation test B, the bar showed a transverse rupture strength of 9240 p.s.i. in air at 1550° C.

*Example XIII*

Aluminum flake (80 g.), boron carbide powder (60 g.), and silicon carbide powder (60 g.) were ball-milled 16 hours at 80 r.p.m. in a 1-quart porcelain ball-mill containing 25 ¾″ x ¾″ porcelain cylinders. The resultant fine powder which contained aluminum, boron, carbon and silicon in the proportions 40:22.5:16.5:21 was pressed at 60,000 p.s.i. at room temperature in a steel mold to produce a bar nominally 2″ x ¼″ x ¼″. The bar was sintered in nitrogen for one hour at 800° C. During sintering the weight gain was 11.5% and the average dimensional change was +0.5%. The sintered bar was straight, gray and had an electrical resistance from end-to-end of 80 ohms. It corresponded in composition to 35.9% Al, 20.2% B, 14.8% C, 10.3% N, and 18.8% Si. During standard oxidation test B, the bar gained 3.8% in weight and 0.25% in average dimension. After the oxidation test, the bar exhibited a breaking strength in transverse bend in air of 35,000 p.s.i. at 1650° C. without plastic yield. The electrical resistance was greater than 10$^6$ ohms from end-to-end. This bar was characterized by a relatively thick oxide case, which in objects of large cross section may lead to cracking under high thermal stress. For many uses, compositions higher in aluminum content and somewhat lower in nitrogen than the present one are preferred.

*Example XIV*

A mixture of aluminum flake, boron carbide, and silicon carbide powders was prepared as described in Example XIII. Two bars were molded by pressing at room temperature under a pressure of 60,000 p.s.i. and sintered in nitrogen at 850° C. for 1 hour. On sintering, one bar exhibited a weight gain of 11.75%, the other a gain of 9.96%. These bars were crushed and the resultant fragments ball-milled together in proportions (54 parts of the first bar and 20.1 parts of the second bar) yielding a powder composition containing aluminum, boron, carbon, nitrogen and silicon in the proportions 36:20.2:14.8:10.1:18.8. A portion of this powder was sieved through a 200 mesh screen and mixed with equal parts of aluminum flake to produce a composition containing the ingredients in the ratio 68:10.1:7.4:5:9.4. This mixture was ball-milled and compressed in a bar mold under 40,000 p.s.i. at room temperature. The bar was sintered in nitrogen at 850° C. for one hour. During sintering, the weight gain was 11.5%. The composition was the sintered bar was 61% Al, 9.1% B, 6.6% C, 14.8% N, and 8.4% Si. In standard oxidation test B, this bar gained 13.68% in weight but remained perfectly straight and increased only 1.34% in dimension (average of three). The resultant bar showed a transverse rupture strength of 19,800 p.s.i. in air at 1650° C. with no plastic yield. Thus, in a process conducted at relatively low temperature, a bar derived from low cost ingredients which compares in strength with the best high temperature, hot-pressed commercial materials have been produced. It will be clear to those skilled in the art that the process of this example can be applied to other compositions of this invention. Instead of refined commercial boron carbide and silicon carbide starting materials, reacted or partially reacted masses yielding the desired boron-carbon-silicon ratios may be used, provided they do not contain large amounts of free carbon, metallic impurities, nitrides or oxides.

The final converted objects of this invention, upon being heated at high temperatures in air, undergo some oxidation and nitridation. However, dimensional changes are limited to a few percent (and even to 0.1% by choice of ingredients and process) when the objects are exposed in air at temperatures up to 1500° C. Despite the fact that gain in weight may range from less than 1% to 10–30% (in porous objects), the objects are strengthened and porosity is reduced by such heat-treatment and there is little distortion or cracking in comparison with other high temperature materials.

Since the converted objects of this invention, depending chiefly upon their aluminum content, range from electrically insulating to electrically conducting, and are comparable to graphite in density, they are especially useful in high temperature electrical applications. In such application, these converted objects possess the great advantage over graphite that protection from contact with air is unnecessary. The converted objects exhibit a transverse rupture strength-to-weight ratio which ranges up to ten times that of graphite.

In preparing electrical heating elements, it is sometimes desirable to heat-treat the center portion of a rod, thereby increasing the electrical resistance thereof, but to leave the end portions unheat-treated (or heat-treated only to temperatures of 1100°–1200° C.) and therefore highly conducting. Such elements are especially suitable for application at temperatures in the range of 1000°–1500° C. and above.

The composition of the converted objects, as described above, is given in terms of the major components, i.e., the essential constituents. However, there may also be present amounts not exceeding 10%, usually less than 5%, and preferably less than 3% of other materials such as metal carbides and metal oxides that do not materially affect the novel properties of the converted objects. Such additional materials are generally present in commercial forms of the materials used in preparing the compositions of this invention. It is preferred that the powder metallurgy compositions be substantially free from uncombined elements such as titanium, zirconium, molybdenum, chromium, iron, carbon, etc. which adversely affect the firing process and the final properties of the converted objects.

The converted objects of this invention are useful as furnace parts, hot-pressing molds, parts of heat engines, especially those to be air-borne, parts of aircraft subject to high heat by virtue of high velocity in the atmosphere, and high temperature testing fixtures. They are also suitable for use in shielding thermonuclear reactors from the escape of neutrons. They have high thermoelectric power and can therefore be used for generation of electricity by the application of heat. When sufficient aluminum is used for the converted objects to be electrically conductive, they serve admirably as electric heating elements. They are used also as structural objects in pumps, containers, pipes and other equipment processing molten metals, such as Al, Fe and Cu alloys.

Since obvious modifications and equivalents in the invention will be evident to those skilled in the metallurgical arts, I propose to be bound solely by the appended claims.

The embodiments of the invention in which an exclusive property or privilege is claimed are defined as follows:

1. A composition consisting essentially of aluminum, boron, carbon, nitrogen, silicon, and oxygen in the proportions by weight based on total aluminum, boron, carbon, nitrogen, and silicon of 15–73% Al, 3–45% B, 1.5–20% C, 3–26% N, 3–40% Si, and 0–30% O, the amount of aluminum present exceeding by at least 5% by weight the amount required to react completely with the nitrogen and oxygen present, the elements Al, B, C, N and Si being present in at least one of the forms selected from the class consisting of elemental aluminum, aluminum-boron alloys, aluminum-silicon alloys, aluminum-boron-silicon alloys, aluminum nitride, aluminum oxide, boron carbide, boron oxide, silicon carbide, silicon dioxide and silicon nitride.

2. A high temperature-resistant converted composition consisting essentially of aluminum, boron, carbon, nitrogen, silicon, and oxygen in the proportions by weight based on total aluminum, boron, carbon, nitrogen, and silicon of 15–73% Al, 3–45% B, 1.5–20% C, 3–26% N, 3–40% Si, and 0–30% O, said composition containing a solid continuous matrix structure composed of aluminum nitride and at least one carbide selected from the group consisting of boron carbide and silicon carbide and a metallic structure containing at least 5% based on the weight of the composition of aluminum in the form of at least one of elemental aluminum, and alloys thereof with elemental silicon and boron, said metallic structure constituting at most 67% by weight of the converted composition.

3. A high temperature-resistant converted composition consisting essentially of aluminum, boron, carbon, nitrogen, and silicon in the proportions by weight based on total aluminum, boron, carbon, nitrogen, and silicon of 40–60% Al, 5–28% B, 2–20% C, 4–15% N, and 3–40%

Si, said composition containing a solid continuous matrix structure composed of aluminum nitride and at least one carbide selected from the group consisting of boron carbide and silicon carbide, and a metallic structure containing at least 5% based on the weight of the composition of aluminum, said metallic structure constituting at most 50% by weight of the converted composition.

4. A composition of claim 1 in the form of a powder in which at least 75% by weight of the powder has a particle size of less than 75 microns.

5. A high temperature-resistant converted composition consisting essentially of aluminum, boron, carbon, nitrogen and silicon in the proportions by weight of 44.0% Al, 6.8% B, 12.4% C, 12.1% N, and 24.7% Si, said composition containing a solid continuous matrix structure composed of aluminum nitride and at least one carbide selected from the group consisting of boron carbide and silicon carbide, and a metallic structure containing at least 5% based on the weight of the composition of aluminum in the form of at least one of elemental aluminum and alloys thereof with elemental silicon and boron, said metallic structure constituting at most 67% by weight of the converted composition.

6. A dimensionally stable object consisting essentially of aluminum, boron, carbon, nitrogen, and silicon in the proportions by weight of 57.1% Al, 21.4% B, 10.0% C, 4.9% N, and 6.7% Si, said object containing a solid continuous matrix structure composed of aluminum nitride and at least one carbide selected from the group consisting of boron carbide and silicon carbide, and a metallic structure containing at least 5% based on the weight of the object of aluminum, in the form of at least one of elemental aluminum and alloys thereof with elemental silicon and boron, said metallic structure constituting at most 67% by weight of the object.

7. A high temperature-resistant converted composition consisting essentially of aluminum, boron, carbon, nitrogen, oxygen, and silicon in the proportions by weight of 43.7% Al, 13.1% B, 11.5% C, 12.5% N, 1.4% O and 16.0% Si, said composition containing a solid continuous matrix structure composed of aluminum nitride and at least one carbide selected from the group consisting of boron carbide and silicon carbide, and a metallic structure containing at least 5% based on the weight of the composition of aluminum in the form of at least one of elemental aluminum and alloys thereof with elemental silicon and boron, said metallic structure constituting at most 67% by weight of the converted composition.

converted compositions of claim 2 which comprises nitrid-

8. Process for preparing high temperature-resistant, converted compositions of claim 2 which comprises nitriding at a temperature of 700–1425° C. aluminum-boron carbide-silicon carbide compacts containing 15–73% Al with boron carbide and silicon carbide in the ratio of 1:3 to 3:1, and continuing said nitriding only so long as the resulting compositions still contain at least 5% by weight of aluminum in excess of the amount of aluminum required to react completely with the nitrogen and oxygen present.

9. Process for preparing high temperature-resistant, converted compositions of claim 2 which comprises nitriding at a temperature of 700–1425° C. aluminum-boron carbide-silicon carbide compacts containing 15–73% Al with boron carbide and silicon carbide in the ratio of 1:3 to 3:1, powdering the converted product, mixing the resulting powder with aluminum, compressing the mixture thus obtained, and further nitriding only so long as the resulting compositions still contain at least 5% by weight of aluminum in excess of the amount of aluminum required to react completely with the nitrogen and oxygen present.

References Cited by the Examiner

UNITED STATES PATENTS

| | | | |
|---|---|---|---|
| 2,839,413 | 6/1958 | Taylor | 75—205 |
| 3,063,832 | 11/1962 | Snyder | 75—138 |
| 3,078,191 | 2/1963 | Maedo | 148—11.5 |
| 3,079,251 | 2/1963 | Donnelly et al. | 75—134 |
| 3,084,080 | 4/1963 | Hunter et al. | 148—11.5 |
| 3,151,994 | 10/1964 | Adlassnig | 29—182.5 |

L. DEWAYNE RUTLEDGE, *Primary Examiner.*

DAVID L. RECK, CARL D. QUARFORTH, REUBEN EPSTEIN, *Examiners.*

N. F. MARKVA, R. L. GRUDZIECKI,
*Assistant Examiners.*

UNITED STATES PATENT OFFICE
CERTIFICATE OF CORRECTION

Patent No. 3,262,762                                July 26, 1966

Max F. Bechtold

It is hereby certified that error appears in the above numbered patent requiring correction and that the said Letters Patent should read as corrected below.

Columns 1 and 2, TABLE I, fourth column, line 6 thereof, for "$5+10^{-3}$" read -- $5\times10^{-3}$ --; column 6, line 13, for "wtih" read -- with --; column 9, line 63, for "503/4" read -- 50 3/4 --; column 15, line 37, for "composition was" read -- composition of --; line 46, for "have" read -- has --; column 18, line 5, strike out "converted compositions of claim 2 which comprises nitrid-".

Signed and sealed this 1st day of August 1967.

(SEAL)
Attest:

Edward M. Fletcher, Jr.                                EDWARD J. BRENNER
Attesting Officer                                           Commissioner of Patents